US012785496B2

(12) United States Patent
Matsuo

(10) Patent No.: US 12,785,496 B2
(45) Date of Patent: Nov. 3, 2026

(54) DRIVE DEVICE

(71) Applicant: DENSO CORPORATION, Kariya-city (JP)

(72) Inventor: Yasufumi Matsuo, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 190 days.

(21) Appl. No.: 18/767,575

(22) Filed: Jul. 9, 2024

(65) Prior Publication Data

US 2024/0364182 A1 Oct. 31, 2024

Related U.S. Application Data

(63) Continuation of application No. PCT/JP2023/000360, filed on Jan. 11, 2023.

(30) Foreign Application Priority Data

Jan. 11, 2022 (JP) ................................ 2022-002567

(51) Int. Cl.
*H02K 5/22* (2006.01)
*B62D 5/04* (2006.01)

(52) U.S. Cl.
CPC ............ *H02K 5/225* (2013.01); *B62D 5/046* (2013.01)

(58) Field of Classification Search
CPC .......... H02K 5/225; H02K 11/33; H02K 5/22; H02K 11/30; B62D 5/046; B62D 5/0406
See application file for complete search history.

(56) References Cited

U.S. PATENT DOCUMENTS 6,177,740 B1 * 1/2001 Burns .................... H02K 11/33 310/68 R
2001/0031567 A1 10/2001 Orui et al.
2001/0031568 A1 * 10/2001 Brekosky ........... H01R 12/7082 439/74
2022/0131447 A1 4/2022 Mueller et al.

FOREIGN PATENT DOCUMENTS

JP H05-343139 A 12/1993
JP 2005-294312 A 10/2005
WO 2020/162530 A1 8/2020

* cited by examiner

*Primary Examiner* — Tulsidas C Patel
*Assistant Examiner* — Mohammed Ahmed Qureshi
(74) *Attorney, Agent, or Firm* — Precision Patents, P.C.

(57) ABSTRACT

A drive device includes a motor and a control unit that are configured integrally. A motor frame is disposed at an end portion of the motor close to the control unit. A cover includes a top plate portion facing the motor frame and an outer cylinder portion extending from an outer edge of the top plate portion toward the motor frame. Two or more boards are arranged in multiple stages between the motor frame and the top plate portion, and electronic components constituting the control unit are mounted on the boards. The boards include a first board closest to the motor frame and a second board arranged in a second stage. An inter-board connection component electrically connects adjacent boards. Composite fastening members fasten the first board to the motor frame on a same axis as fastening the second board to the motor frame.

4 Claims, 14 Drawing Sheets

DRIVE DEVICE

CROSS REFERENCE TO RELATED APPLICATIONS

The present application is a continuation application of International Patent Application No. PCT/JP2023/000360 filed on Jan. 11, 2023, which designated the U.S. and claims the benefit of priority from Japanese Patent Application No. 2022-002567 filed on Jan. 11, 2022. The entire disclosures of all of the above applications are incorporated herein by reference.

TECHNICAL FIELD

The present disclosure relates to a drive device.

BACKGROUND

Conventionally, there has been known a drive device in which a motor and a control unit are configured integrally.

SUMMARY

The present disclosure provides a drive device including a motor and a control unit that are configured integrally. The drive device further includes a motor frame, a cover, two or more boards, an inter-board connection component, and composite fastening members. The motor frame is disposed at an end portion of the motor close to the control unit. The cover includes a top plate portion facing the motor frame and an outer cylinder portion extending from an outer edge of the top plate portion toward the motor frame. The boards are arranged in multiple stages between the motor frame and the top plate portion, and electronic components constituting the control unit are mounted on the boards. The boards include a first board closest to the motor frame and a second board arranged in a second stage. The inter-board connection component electrically connects adjacent boards. The composite fastening members fasten the first board to the motor frame on a same axis as fastening the second board to the motor frame.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
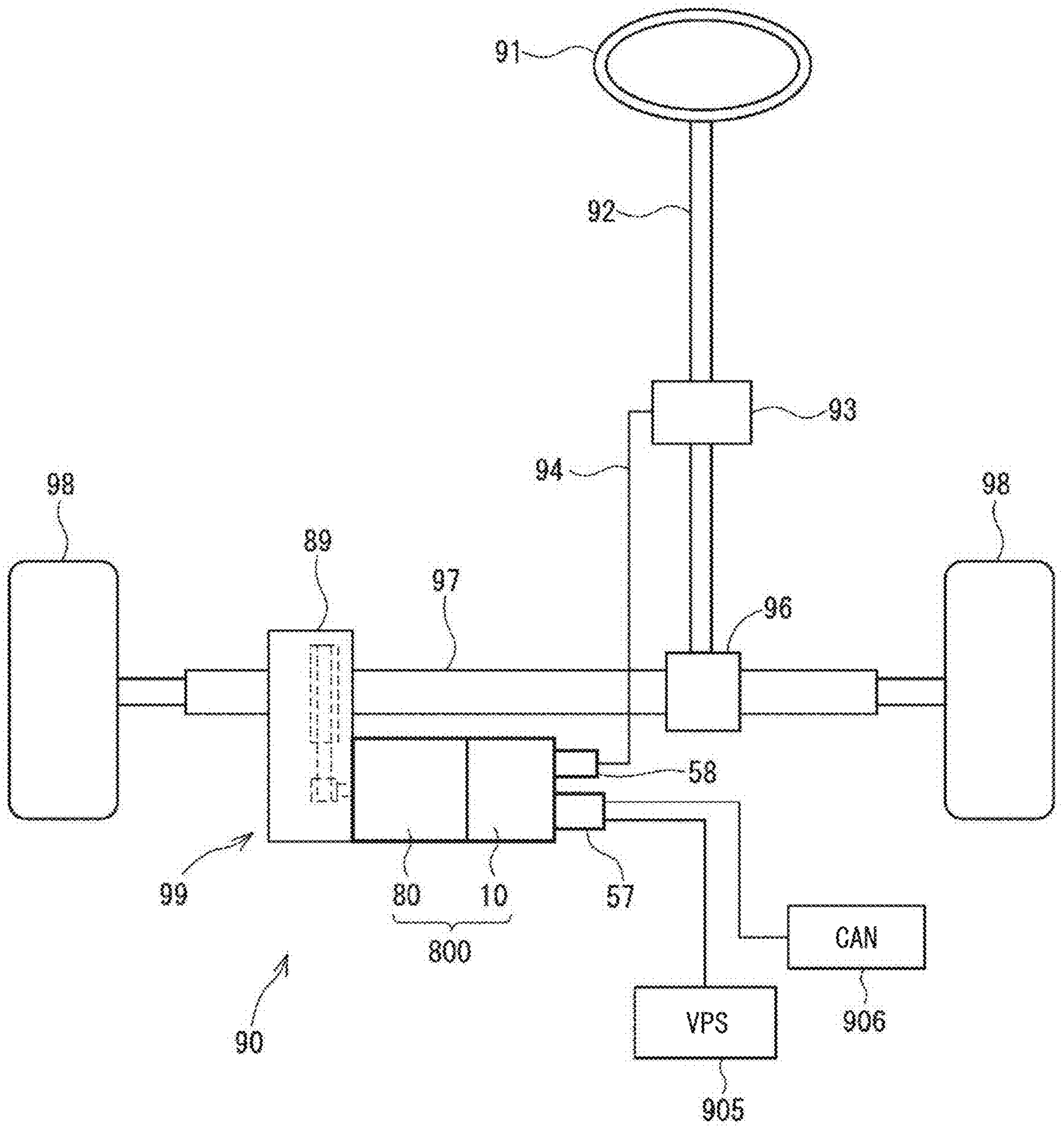
FIG. 1 is a schematic configuration diagram of an electric power steering apparatus to which a drive device is applied.

Next, a relevant technology is described only for understanding the following embodiments. A drive device according to the relevant technology includes two boards electrically connected to each other by electrical connection portions. If the drive device does not have fastening portions for rigidly fixing the boards apart from the electrical connection portions, there is a possibility that the electrical connection portions will break due to stress caused by vibration, temperature change, or the like. However, if fastening portions are provided at multiple points, a diameter size of the drive device increases, and a mountability of the drive device is deteriorated.

A drive device according to an aspect of the present disclosure includes a motor and a control unit that are configured integrally. The motor includes a stator and a rotor. The control unit is disposed to one side of the motor in an axial direction of the motor and configured to drive and control the motor. The drive device further includes a motor frame, a cover, N boards, an inter-board connection component, and composite fastening members. N is an integer greater than or equal to two.

The motor frame is disposed at an end portion of the motor close to the control unit in the axial direction of the motor. The cover includes a top plate portion facing the motor frame, and an outer cylinder portion extending from the outer edge of the top plate portion toward the motor frame. The cover has an external connector.

On the N boards, electronic components constituting the control unit are mounted. The N boards are arranged in multiple stages between the motor frame and the top plate portion and includes a first board closest to the motor frame and an Nth board closest to the top plate portion. The inter-board connection component electrically connects adjacent boards among the N boards.

The composite fastening members fasten at least the first board and a second board, which is included in the N boards and disposed in a second stage, to the motor frame. The composite fastening members fasten the first board to the motor frame on a same axis as fastening the second board to the motor frame.

In the drive device according to the above aspect, a space for fastening the boards can be reduced by fastening the first board to the motor frame on the same axis as fastening the second board to the motor frame. Therefore, it is possible to ensure the mounting area for the electronic components without increasing the diameter size of the driving device.

Hereinafter, drive devices according to multiple embodiments will be described with reference to the drawings. In the following embodiments, substantially identical elements have the same numerals, and description of the identical elements will not be repeated. The following first to fourth embodiments are collectively referred to as "present embodiment". The drive device of the present embodiment is applied, for example, as a steering assist motor of an electric power steering apparatus. The drive device includes a motor and a control unit that are configured integrally, and the control unit is configured to drive and control the motor.

[Configuration of Electric Power Steering Apparatus]

A schematic configuration of an electric power steering apparatus 99 will be described with reference to FIG. 1. Although FIG. 1 illustrates a rack-assist type electric power steering apparatus, a drive device 800 of the present embodiment can also be applied to a column-assist type electric power steering apparatus. A steering system 90 includes a steering wheel 91, a steering shaft 92, a pinion gear 96, a rack shaft 97, wheels 98, and the electric power steering apparatus 99.

The steering shaft 92 to which the steering wheel 91 is connected is provided with a torque sensor 93 that detects steering torque. The pinion gear 96 that engages with the rack shaft 97 is disposed at an end of the steering shaft 92. When the driver rotates the steering wheel 91, a rotational movement of the steering shaft 92 is converted into a linear movement of the rack shaft 97 by the pinion gear 96. A pair of wheels 98 connected to both ends of the rack shaft 97 are steered to an angle corresponding to the amount of displacement of the rack shaft 97.

The electric power steering apparatus 99 includes the drive device 800 in which a motor 80 and a control unit 10 are configured integrally, and a reduction gear 89 that reduces the speed of the rotation of the motor 80 and transmits the reduced rotation to the rack shaft 97. The motor 80 is a two-system three-phase brushless motor having two sets of three-phase windings. The control unit 10 can supply power to the two sets of three-phase windings using two systems of inverter circuits. In particular, the present embodiment assumes a "completely two system" configuration in which power supplies and signals are input and output for each system. The motor 80 outputs a steering assist torque when supplied with three-phase alternating current (AC) power converted from direct current (DC) power by the inverter circuit of the control unit 10.

The DC power is supplied from a vehicle power supply (VSP) 905 to power supply system connectors 57 of the control unit 10, and communication signals with a vehicle communication network (CAN) 906 are also input and output to the power supply system connectors 57. A sensor signal detected by the torque sensor 93 is input to a signal system connector 58 via a harness 94. The power supply system connectors 57 and the signal system connectors 58 correspond to external connectors to which power and signals are input from the outside, and are distinguished from plug connectors provided inside the control unit 10, which will be described later.

[Configuration of Drive Device]

Figure 2:
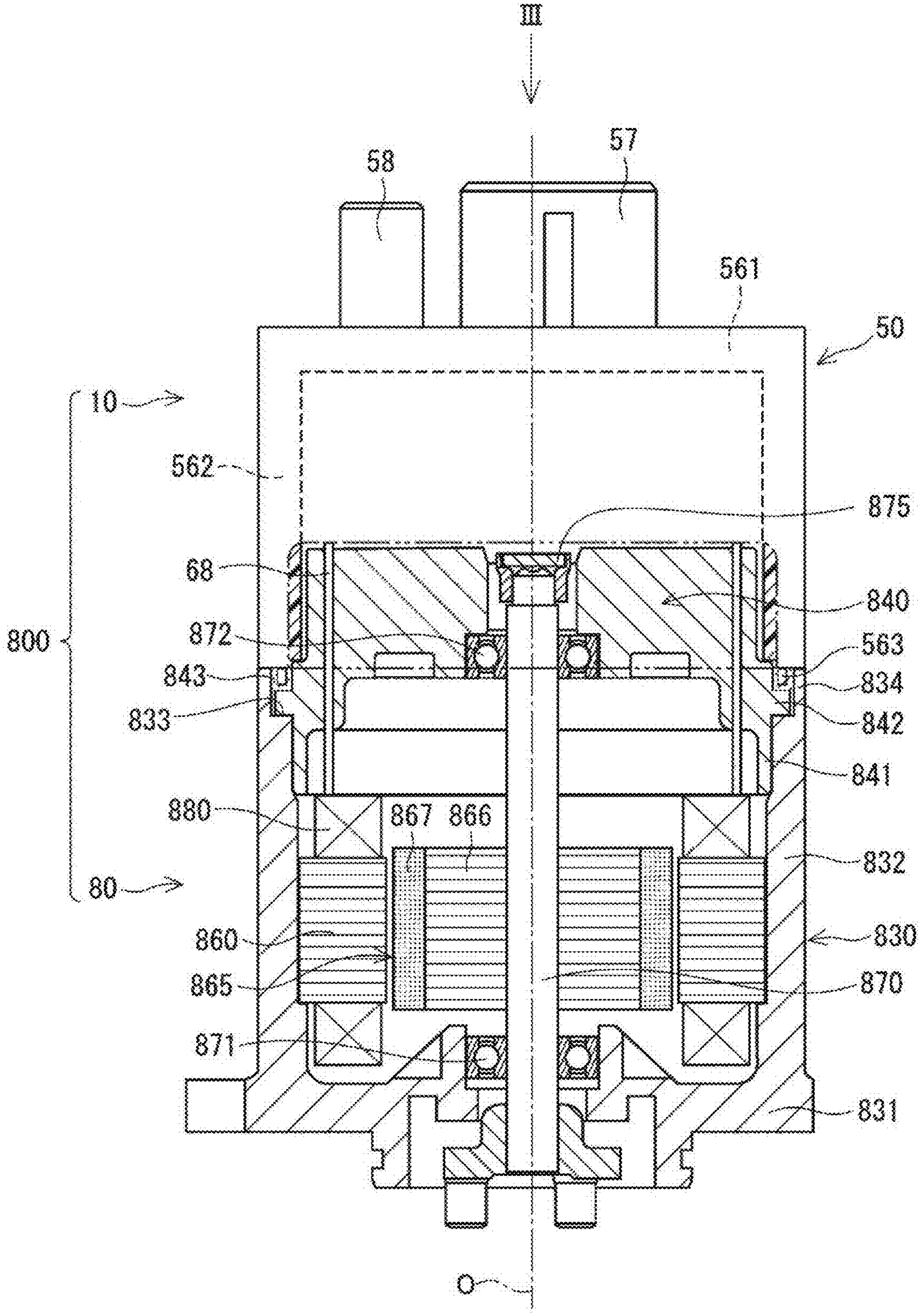
FIG. 2 is a partial cross-sectional view showing a motor portion of the drive device.

First, the overall configuration of the drive device 800 will be described with reference to FIGS. 2 and 3. A direction parallel to a rotation axis O of the motor 80 shown in FIG. 2 is referred to as an "axial direction", and a view seen from above in FIG. 2 in the axial direction is referred to as a plan view. The control unit 10 is disposed to one side of the motor 80 in the axial direction. In other words, the drive device 800 has a so-called "mechanical and electrical integrated type" configuration.

The motor 80 includes a motor case 830, a motor frame 840, a stator 860, a rotor 865, and the like. The motor case 830 is formed into a substantially bottomed cylindrical shape including a bottom portion 831 and a cylindrical portion 832, and the control unit 10 is disposed adjacent to an opening end of the motor case 830. A thin groove-forming wall 834 is disposed at the opening end of the cylindrical portion 832 via a stepped portion 833.

The stator 860 is fixed inside the cylindrical portion 832 of the motor case 830 has three-phase motor windings 880 wound therein. The control unit 10 controls the supply of current to the motor windings 880, so that a rotating magnetic field is generated in the stator 860. The rotor 865 is disposed inside the stator 860, and has a shaft 870 fixed at its center. The shaft 870 is rotatably supported by a front bearing 871 held by the bottom portion 831 of the motor case 830 and a rear bearing 872 held by the motor frame 840.

In the rotor 865, multiple permanent magnets 867 are disposed on an outer periphery of a rotor core 866. The rotor 865 rotates about the shaft 870 by the rotating magnetic field generated in stator 860. A sensor magnet 875 for detecting a rotation angle is provided at an end of the shaft 870 adjacent to the control unit 10.

The motor frame 840 is disposed at an end portion of the motor 80 close to the control unit 10 in the axial direction. The motor frame 840 is made of an aluminum alloy or the like, and has a frame portion 841 and a flange portion 842. The frame portion 841 is press-fitted inside the motor case 830. The flange portion 842 formed on an outer periphery of the frame portion 841 is in contact with the stepped portion 833 of the motor case 830. A seal groove 843 filled with adhesive is formed in an annular space defined by an outer wall of the frame portion 841, a surface of the flange portion 842 adjacent to the control unit 10, and an inner wall of the groove-forming wall 834 of the motor case 830. The motor frame 840 also functions as a heat sink to which heat generated when the control unit 10 is supplied with current is dissipated.

The cover 50 is made of a resin material such as polybutylene terephthalate (PBT). The cover 50 has a top plate portion 561 facing the motor frame 840 and an outer cylindrical portion 562 extending from an outer edge of the top plate portion 561 toward the motor frame 840. An annular protrusion 563 that protrudes in the axial direction is formed at a tip of the outer cylindrical portion 562. The protrusion 563 is inserted into the seal groove 843, so that the outer cylindrical portion 562 is fixed to the motor 80 or the motor frame 840.

The cover 50 have the external connectors including the power supply system connectors 57 and the signal system connectors 58. For example, the power supply system connectors 57 and the signal system connectors 58 are provided from the top plate portion 561 so that their frontages face the opposite side from the motor 80. FIG. 3 shows an example of the arrangement of the power supply system connectors 57 and the signal system connectors 58. Although FIG. 3 is a view taken in the direction of arrow Ill in FIG. 2, the scale is not the same as that of FIG. 2, but is shown to be the same as those of FIGS. 5, 6, and 7.

Figure 3:
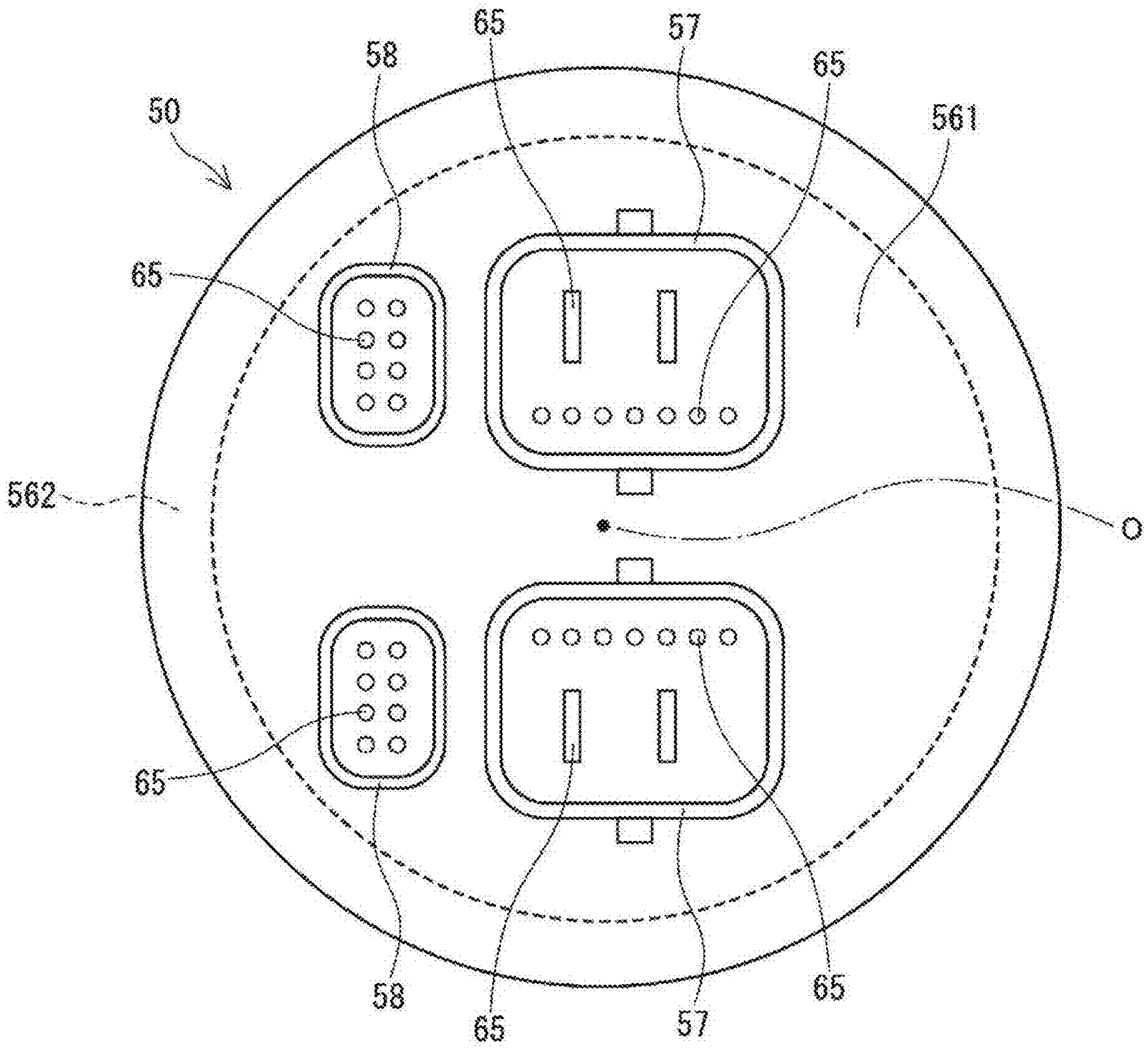
FIG. 3 is a plan view of the drive device viewed in the direction of arrow III in FIG. 2.

In an arrangement example shown in FIG. 3, two sets of the power supply system connector 57 and the signal system connector 58 are provided redundantly. However, in another arrangement example, one set of the power supply system connector 57 and the signal system connector 58 may be provided. The configuration in which two sets of the power supply system connectors 57 and the signal system connector 58 are provided is mainly used in a "completely two system" drive device in which two inverter circuits are connected to separate power supplies and various signals are redundantly input and output. In FIG. 3, the reference numerals for the two systems of external connectors are not distinguished, and are given the same reference numerals "57" and "58". Furthermore, power supply terminals, communication terminals, and signal terminals in respective external connectors are not distinguished and are uniformly referred to as "connector terminals 65".

Next, a configuration of a control unit of each embodiment will be described in order. The reference numerals of the control units in the first and second embodiments have the number of the embodiment added as the third digit following "10". The first embodiment and the second embodiment differ in the configuration of an "inter-board connection component" that electrically connects two boards.

First Embodiment

Figure 4:
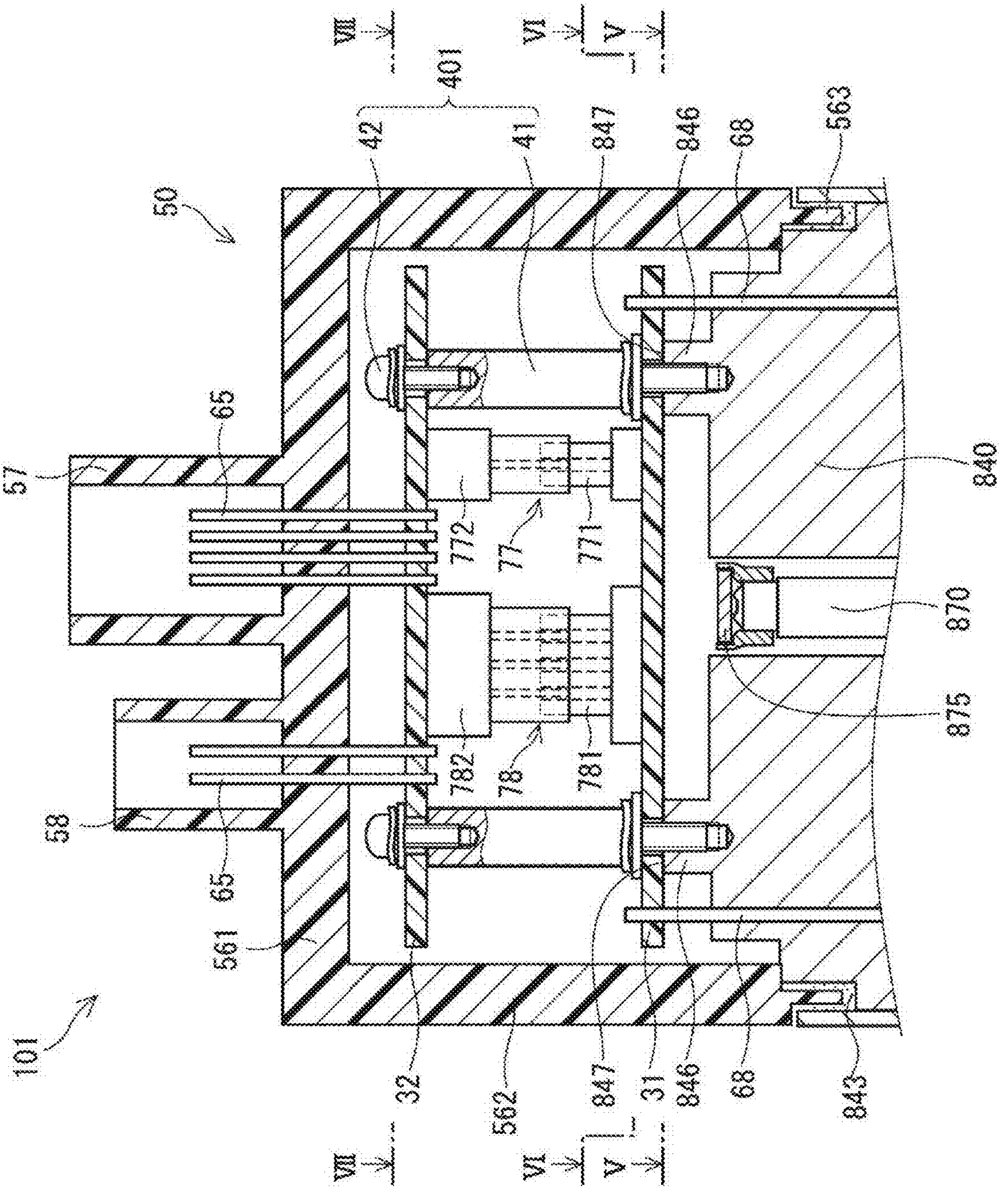
FIG. 4 is a schematic cross-sectional view of a control unit according to a first embodiment.
Figure 5:
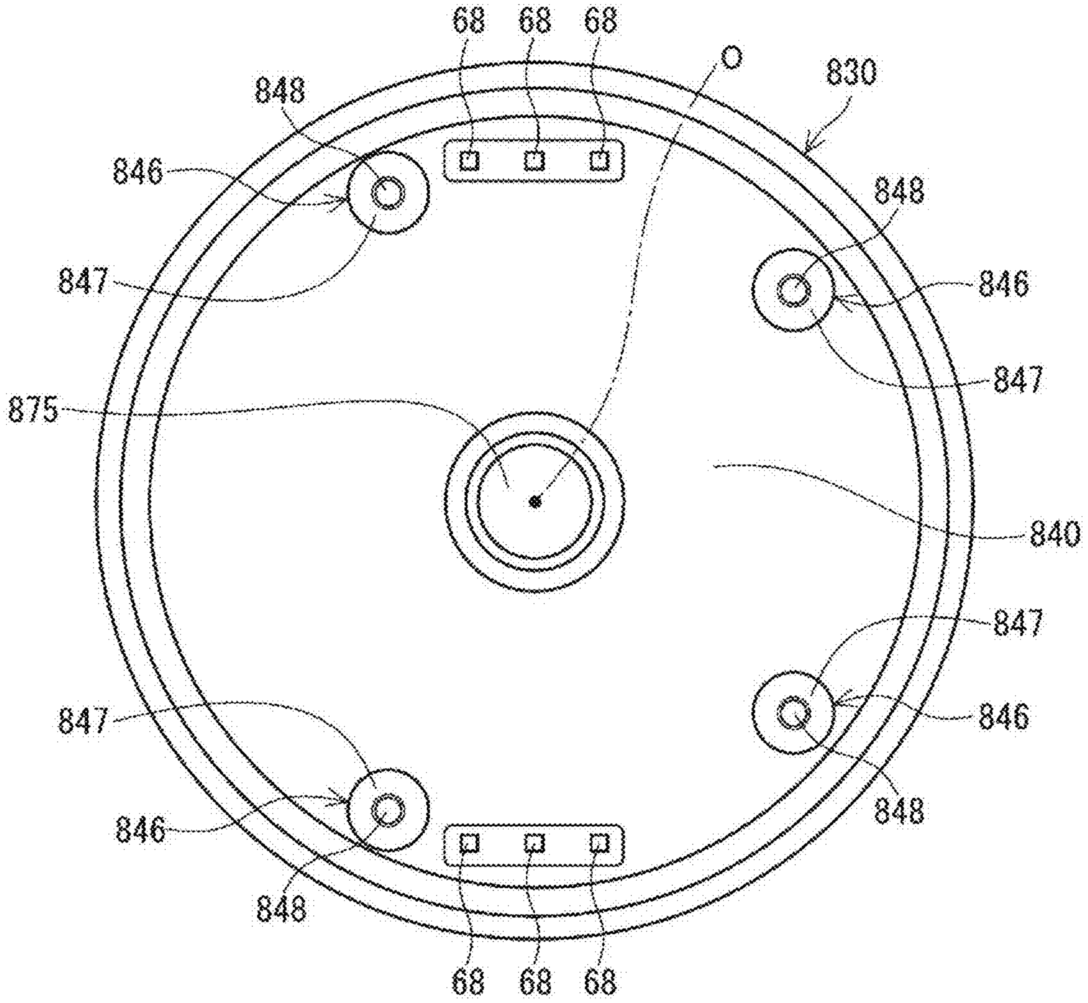
FIG. 5 is a plan view of a motor frame and corresponds to a cross-sectional view taken along line V-V in FIG. 4.
Figure 6:
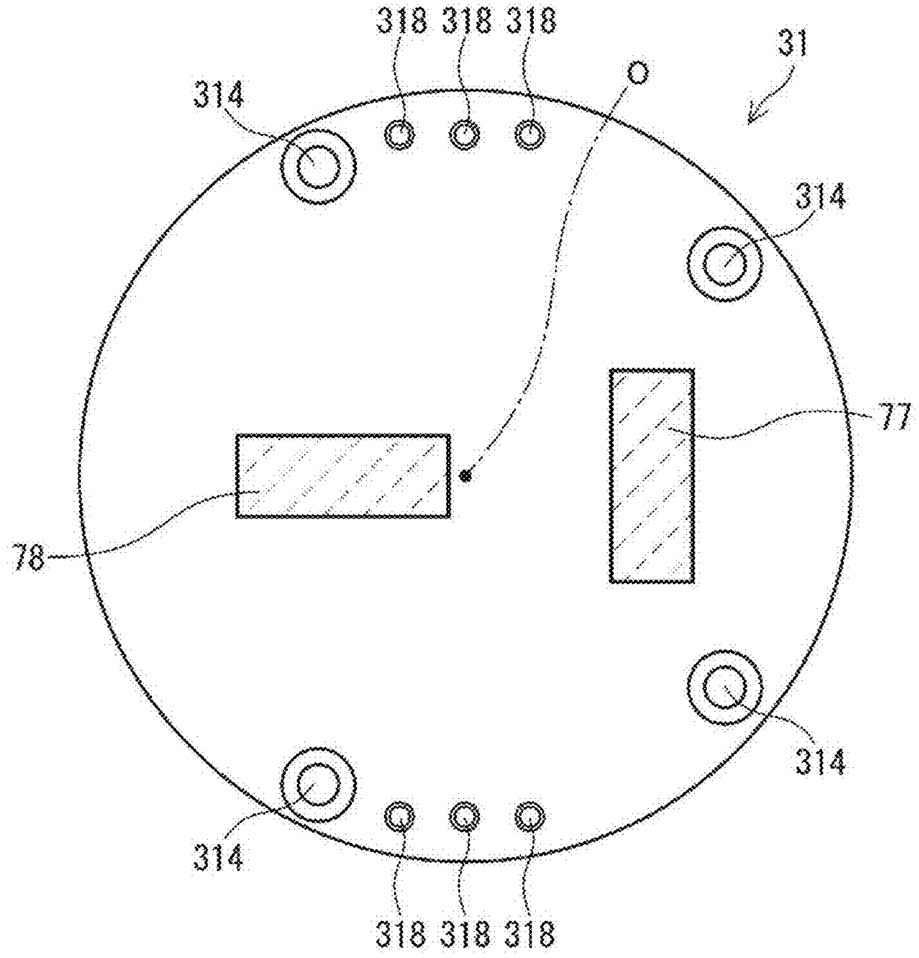
FIG. 6 is a plan view of a motor-side board and corresponds to a cross-sectional view taken along line VI-VI in FIG. 4.
Figure 7:
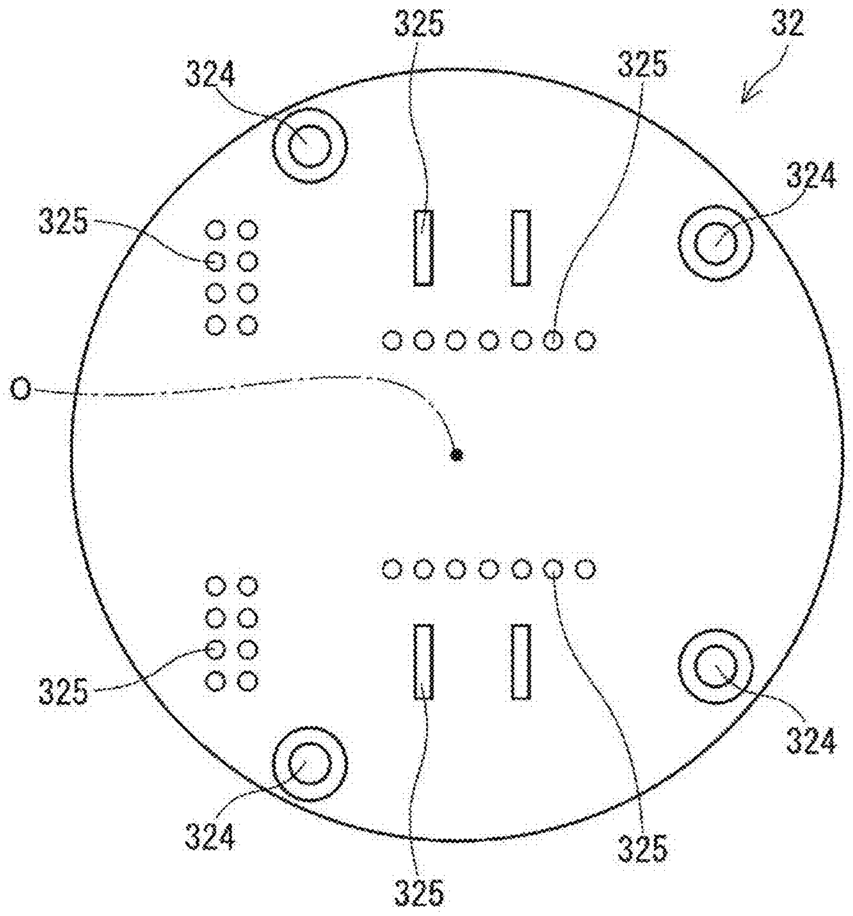
FIG. 7 is a plan view of a connector-side board and corresponds to a cross-sectional view taken along line VII-VII in FIG. 4.
Figure 8:
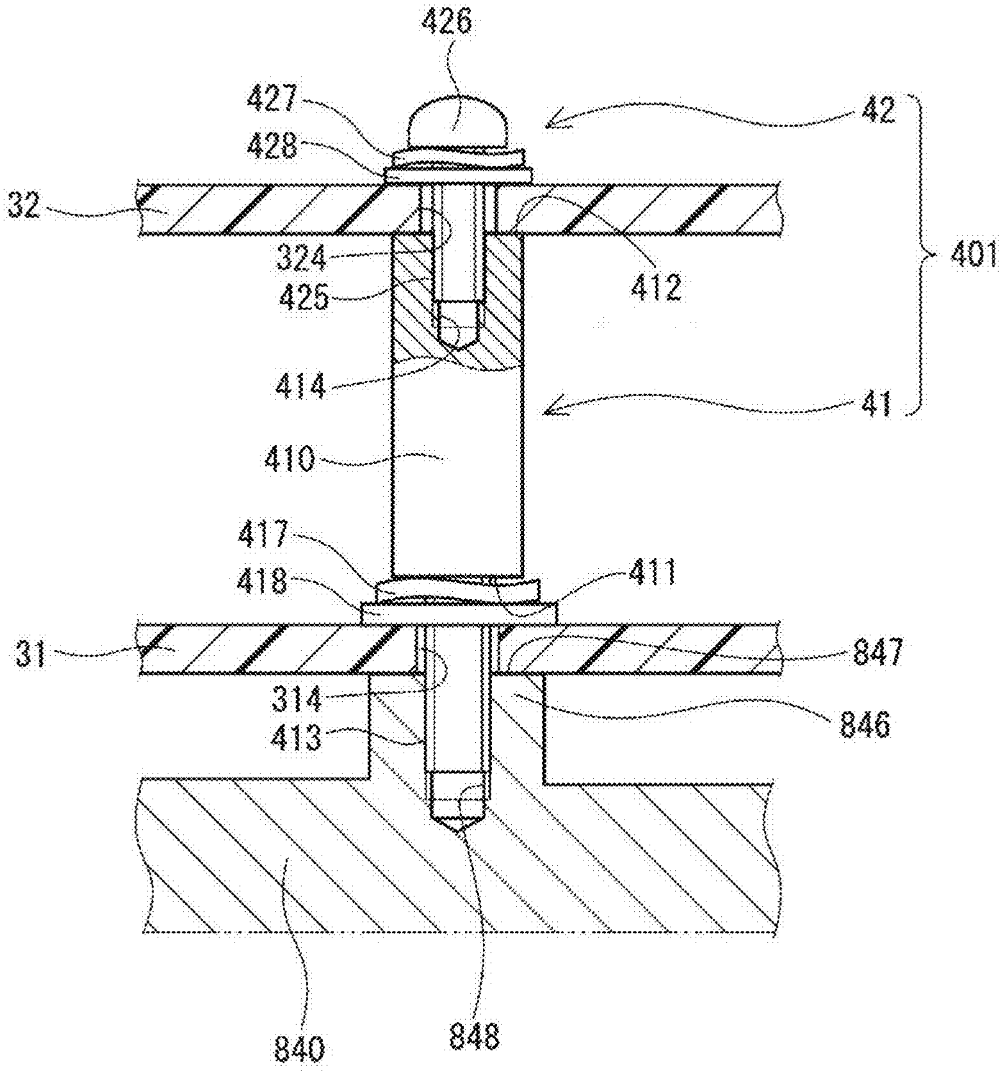
FIG. 8 is a schematic diagram of a composite fastening member including a stud bolt and an upper bolt of a first embodiment.

A configuration of a control unit 101 of the first embodiment will be described with reference to FIGS. 4 to 8. For convenience of explanation, FIG. 4 is a schematic cross-sectional view in which each element is shown at an easily visible position, and is not a diagram corresponding to a specific cross-sectional line in FIG. 3 or the like. FIGS. 5, 6, and 7 are plan views of the motor frame 840, a motor-side board 31, and a connector-side board 32, respectively. FIG. 8 shows the configuration of a "composite fastening member" that fastens the motor-side board 31 and the connector-side board 32 to the motor frame 840.

In the first embodiment, the motor-side board 31 and the connector-side board 32 on which electronic components constituting the control unit 101 are mounted are arranged in two stages between the motor frame 840 and the top plate portion 561 of the cover 50. That is, in "N boards" generalized in the description of other embodiments where N is an integer greater than or equal to two, the first embodiment has a configuration where "N=2". The motor-side board 31 arranged in a first stage corresponds to a "first board" closest to the motor frame 840. The connector-side board 32 arranged in a second stage corresponds to a "second board", and in this case also corresponds to the "Nth board" closest to the top plate portion 561.

Motor terminals 68 of three phases for two systems, which are connected to the motor windings 880, are connected to the motor-side board 31. As shown in FIG. 6, multiple motor terminal holes 318, into which three motor terminals 68 are inserted, are provided at diagonal positions across the rotation axis O in the motor-side board 31.

Various connector terminals 65 connected to the power supply system connectors 57 and the signal system connectors 58 are connected to the connector-side board 32. As shown in FIG. 7, multiple connector terminal holes 325 through which connector terminals 65 are inserted are provided in the connector-side board 32.

Note that "connector" in the name "connector-side board 32" means the power supply system connectors 57 and the signal system connectors 58, which are the external connectors. Although the connector-side board 32 in the first embodiment is spatially placed close to the power supply system connectors 57 and the signal system connectors 58, the name "connector-side board 32" originally means a board wired close to the power supply system connectors 57 and the signal system connectors 58 for electrical connections. Therefore, the arrangement in which the external connectors protrude from a side surface of the outer cylindrical portion 562 as described in other embodiments can be similarly interpreted.

As shown in FIG. 5, in this example, the motor frame 840 has four boss portions 846. The boss portions 846 respectively have seat surfaces 847 on which female threaded portions 848 are formed. As shown in FIG. 6, four fastening holes 314 are formed in the motor-side board 31 at the same positions as the female threaded portions 848 of the boss portions 846. As shown in FIG. 7, four fastening holes 324 are formed in the connector-side board 32 at the same positions as the female threaded portions 848 of the boss portions 846. That is, the fastening holes 314 and 324 of the motor-side board 31 and the connector-side board 32 and the female threaded portions 848 of the motor frame 840 are arranged on the same axis.

The motor-side board 31 is placed on the seat surfaces 847 of the four boss portions 846 provided on the motor frame 840 and fastened to the motor frame 840 with stud bolts 41 through the fastening holes 314. The connector-side board 32 is placed on upper end surfaces of the stud bolts 41 and is fastened to the stud bolts 41 with upper bolts 42 through the fastening holes 324. That is, the connector-side board 32 is fastened to the motor frame 840 via the stud bolts 41. Therefore, the motor-side board 31 and the connector-side board 32 are rigidly fixed to each other.

In this configuration, the stud bolt 41 and the upper bolt 42 constitute a "composite fastening member 401" that fastens the motor-side board 31 and the connector-side board 32 to the motor frame 840 on the same axis. Details of the composite fastening member 401 will be described later with reference to FIG. 8.

As shown in FIGS. 5 to 7, no fastening holes are provided in the motor-side board 31 and the connector-side board 32 other than the four fastening holes 314 and 324 used for fastening the composite fastening members 401. In other words, the composite fastening members 401 are used at all fastening points on the motor-side board 31 and the connector-side board 32.

Plug connectors 77 and 78 as the "inter-board connection components" electrically connect between the motor-side board 31 and the connector-side board 32, and for example, commercially available board-to-board (B to B) connectors are used. As shown in FIGS. 4 and 6, the electrical connection may be shared between two parts: a power supply system plug connector 77 and a signal system plug connector 78.

Lower parts 771 and 781 of the plug connectors 77 and 78 are mounted on an upper surface of the motor-side board 31, and upper parts 772 and 782 of the plug connectors 77 and 78 are attached to a lower surface of the connector-side board 32. The lower parts 771, 781 and the upper parts 772, 782 are electrically connected by fitting male terminals and female terminals. The height of the plug connectors 77 and 78 when the lower parts 771, 781 and the upper parts 772, 782 are connected can be adjusted within a predetermined range. Therefore, even if the distance between the motor-side board 31 and the connector-side board 32 changes slightly, it is possible to flexibly respond to such a change.

The detailed configuration of the composite fastening members 401 of the first embodiment will be described with reference to FIG. 8. Each of the composite fastening member 401 includes the stud bolt 41 having a column portion 410 of a predetermined height, and the upper bolt 42. The stud bolt 41 has a male threaded portion 413 protruding from an lower end surface 411 of the column portion 410, and a female threaded portion 414 formed on an upper end surface 412. The lower end surface 411 of the column portion 410 abuts around the fastening hole 314 of the motor-side board 31 via a wave washer 417 and a washer 418.

The upper bolt 42 is a general-purpose screw such as a pan head machine screw having a male threaded portion 425 and a head 426. The male threaded portion 425 is screwed into the female threaded portion 414 formed on the upper end surface 412 of the column portion 410 of the stud bolt 41. The head 426 abuts around the fastening hole 324 of the connector-side board 32 via a wave washer 427 and a washer 428.

The size of the male threaded portion 425 of the upper bolt 42 is set smaller than the size of the male threaded portion 413 of the stud bolt 41. For example, according to the Japanese Industrial Standards (JIS), the male threaded portion 425 of the upper bolt 42 is M3, and the male threaded portion 413 of the stud bolt 41 is M4. When the size of the male threaded portion 425 of the upper bold 42 and the size of the male threaded portion 413 of the stud bolt 41 are set as described above, an appropriate fastening force can be obtained and loosening of the screws can be restricted.

The female threaded portions 848 are formed on the seat surfaces 847 of the boss portions 846 of the motor frame 840. When the drive device 800 is assembled, first, the male threaded portion 413 of the stud bolt 41 is screwed into the female threaded portion 848 of the motor frame 840 through the fastening hole 314 of the motor-side board 31, so that the motor-side board 31 is fastened to the motor frame 840. Next, the upper bolt 42 is screwed into the female threaded portion 414 of the stud bolt 41 through the fastening hole 324 of the connector-side board 32, so that the connector-side board 32 is fastened to the motor frame 840 via the stud bolt 41.

The effects of the first embodiment will be described. Following items [i] to [iii] are also common to the second to fourth embodiments. Item [iv] is also common to the second embodiment.

[i] In the drive device 800 of the present embodiment, each of the motor-side board 31 and the connector-side board 32 is fastened to the motor frame 840, so that they are rigidly fixed to each other. Accordingly, an external stress caused by vibration, temperature change, or like can be restricted from acting on an electrical connection portion. Thus, the durability of the electrical connection portion can be ensured.

Figure 15:
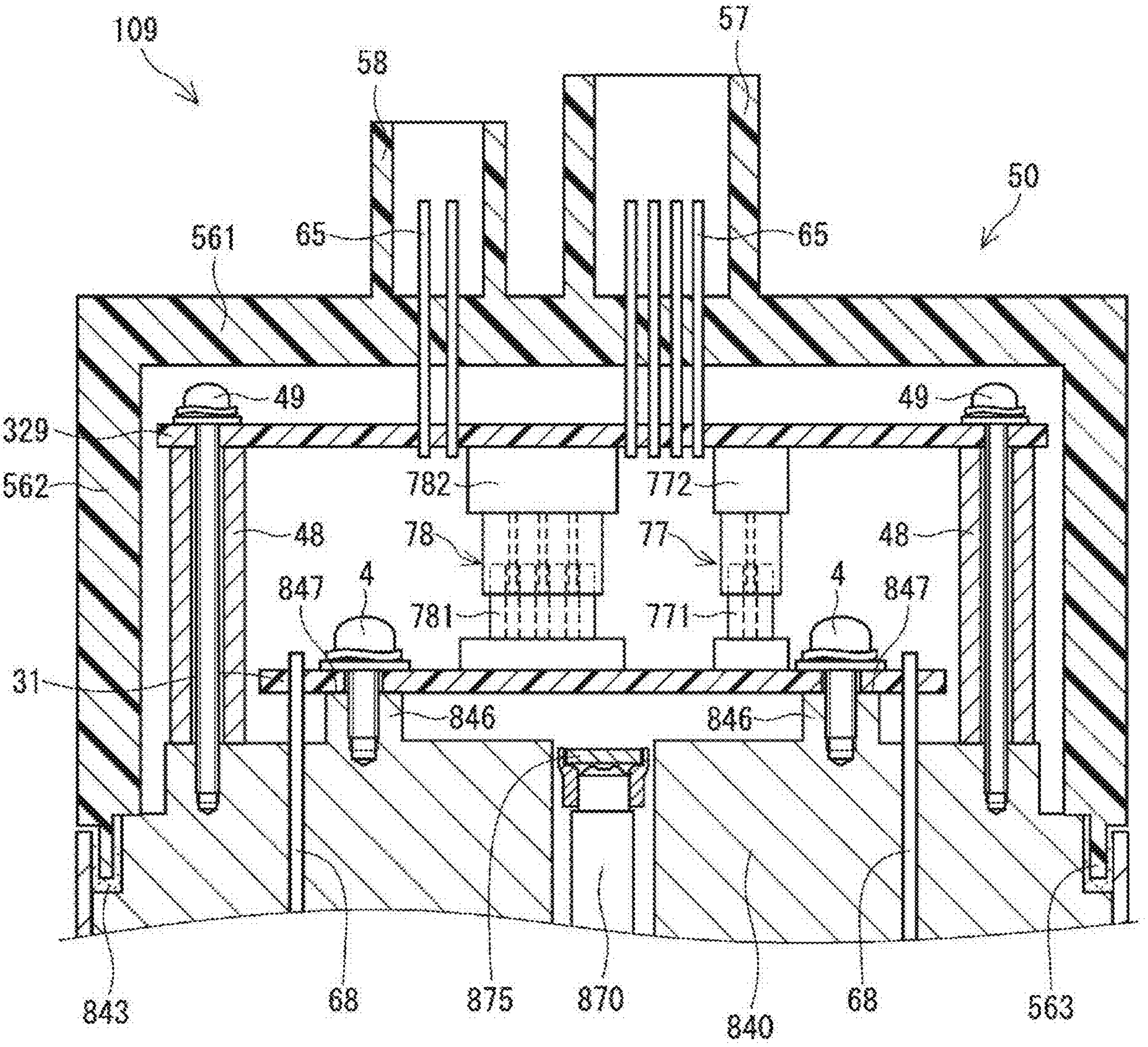
FIG. 15 is a schematic cross-sectional view of a control unit according to a comparative example.

[ii] The effect of using the composite fastening member 401 to fasten the motor-side board 31 and the connector-side board 32 will be explained in comparison with a comparative example. In a control unit 109 of the comparative example shown in FIG. 15, the motor-side board 31 is independently fastened to the motor frame 840 using general-purpose screws 4. A connector-side board 329, which is formed one size larger than the motor-side board 31, is fastened to the motor frame 840 with long screws 49 via collars 48 interposed between the motor frame 840 and the connector-side board 329. If the motor-side board 31 and the connector-side board 329 are fastened at four places each, a total of eight fastening parts are required. Even if a notch is provided in a part of the motor-side board 31 in a circumferential direction to allow the collar 48 to escape, the diameter size of the control unit 109 will be increased in order to ensure the mounting area for the electronic components.

In a drive device in which a motor and a control unit are coaxial and integrated, the diameter size of the entire drive device is determined by the diameter size of the control unit even if the diameter size of the motor is the same. Therefore, the increase in the number of fastening points for the control unit 109 results in a decrease in mountability of the drive device. Furthermore, when the collars 48 are used to fasten the connector-side board 329, the number of parts increases.

In contrast, in the first embodiment, the composite fastening members 401 fasten the motor-side board 31 and the connector-side board 32 on the same axis. Thus, the space for fastening the motor-side board 31 and the connector-side board 32 can be reduced. Therefore, it is possible to ensure the mounting area for the electronic components without increasing the diameter size of the driving device 800. As a result, the mountability is improved due to the reduced size and weight. It also leads to cost reduction.

[iii] In the first embodiment, the composite fastening members 401 are used at all fastening points on the motor-side board 31 and the connector-side board 32. In other words, there are no fastening points other than those where the composite fastening members 401 are used. Therefore, the mounting area for the electronic components can be secured to the maximum, and the effect [ii] is particularly effectively exhibited.

[vi] Each of the composite fastening members 401 of the first embodiment includes the stud bolt 41 and the upper bolt 42. In this structure, the lower end surface 411 of the column portion 410 presses the motor-side board 31, which is advantageous in ensuring the axial force. In addition, since screw chips of the upper bolt 42 do not fall into the surrounding area, the quality is improved. Furthermore, since a general-purpose screw can be used for the upper bolt 42, the cost can be reduced.

[v] The inter-board connection component of the first embodiment includes the plug connectors 77 and 78 whose height at the time of connection is adjustable. Therefore, the distance between the motor-side board 31 and the connector-side board 32 can be flexibly adjusted in accordance with the height of the column portions 410 of the stud bolts 41, which are easy to procure.

Second Embodiment

Figure 9:
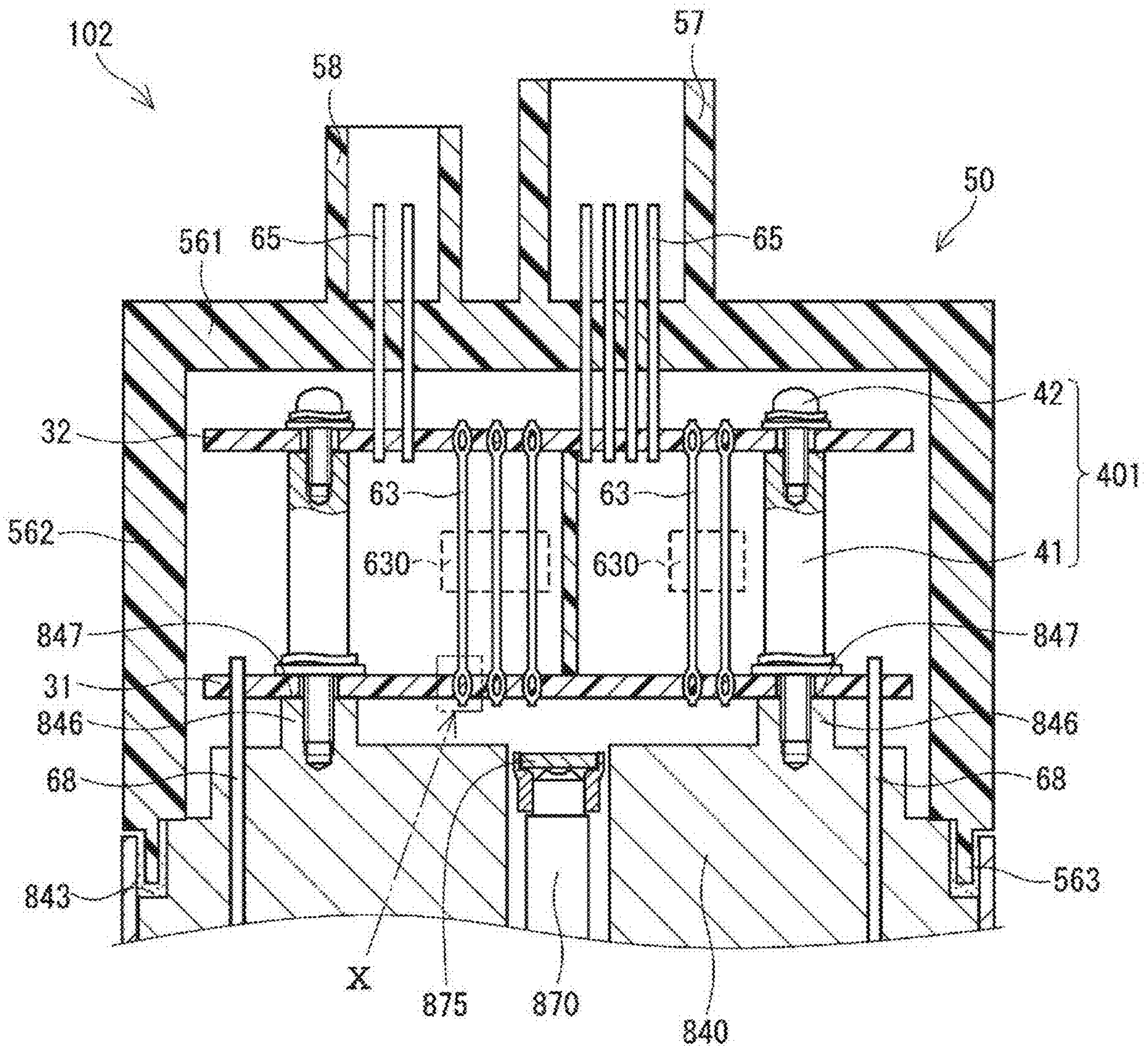
FIG. 9 is a schematic cross-sectional view of a control unit according to a second embodiment.

Next, a second embodiment will be described with reference to FIGS. 9 and 10. In a control unit 102 of the second embodiment, the motor-side board 31 and the connector-side board 32 are electrically connected by multiple inter-board terminals 63 serving as "inter-board connection components". Both ends of the inter-board terminals 63 are electrically connected to the motor-side board 31 and the connector-side board 32 by a press-fit method. As shown by broken lines, intermediate portions of the inter-board terminals 63 may be bound together with a terminal binder 630 made of resin.

Figure 10:
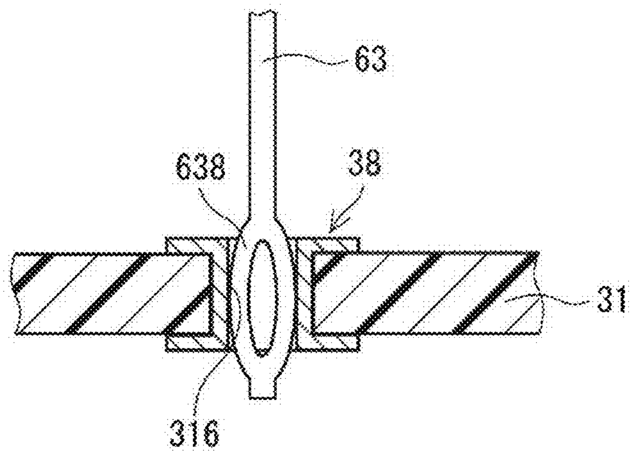
FIG. 10 is an enlarged view of a portion X in FIG. 9.

FIG. 10 shows an example of a press-fit connection shape. A press-fit portion 638 that is elastically deformable is formed at an end of the inter-board terminal 63, and the press-fit portion 638 is press-fitted into an inter-board terminal hole 316 of the motor-side board 31, thereby establishing a press-fit connection. The inter-board terminal hole 316 is provided in a conductive portion 38 such as a via hole. The conductive portion 38 is electrically connected to electronic components and other terminals via conductive patterns, bus bars, and the like (not shown). The press-fit connection shape is not limited to a ring shape as shown in FIG. 10, but may be any shape that can be elastically deformed.

In the second embodiment, since the inter-board terminals 63 of the press-fit type are used, the distance between the motor-side board 31 and the connector-side board 32 can be flexibly adjusted according to the height of the column portions 410 of the stud bolts 41, which are easy to procure. It is not necessary that both ends of each of the inter-board terminals 63 are press-fit connected, but the drive device 800 may also adopt a configuration in which one end of each of the inter-board terminals 63 is press-fit connected, and the other end of each of the inter-board terminals 63 is electrically connected to the board by soldering or the like. Similar effects can be obtained by press-fitting at least one end of each of the inter-board terminals 63.

Third and Fourth Embodiments

Figure 11:
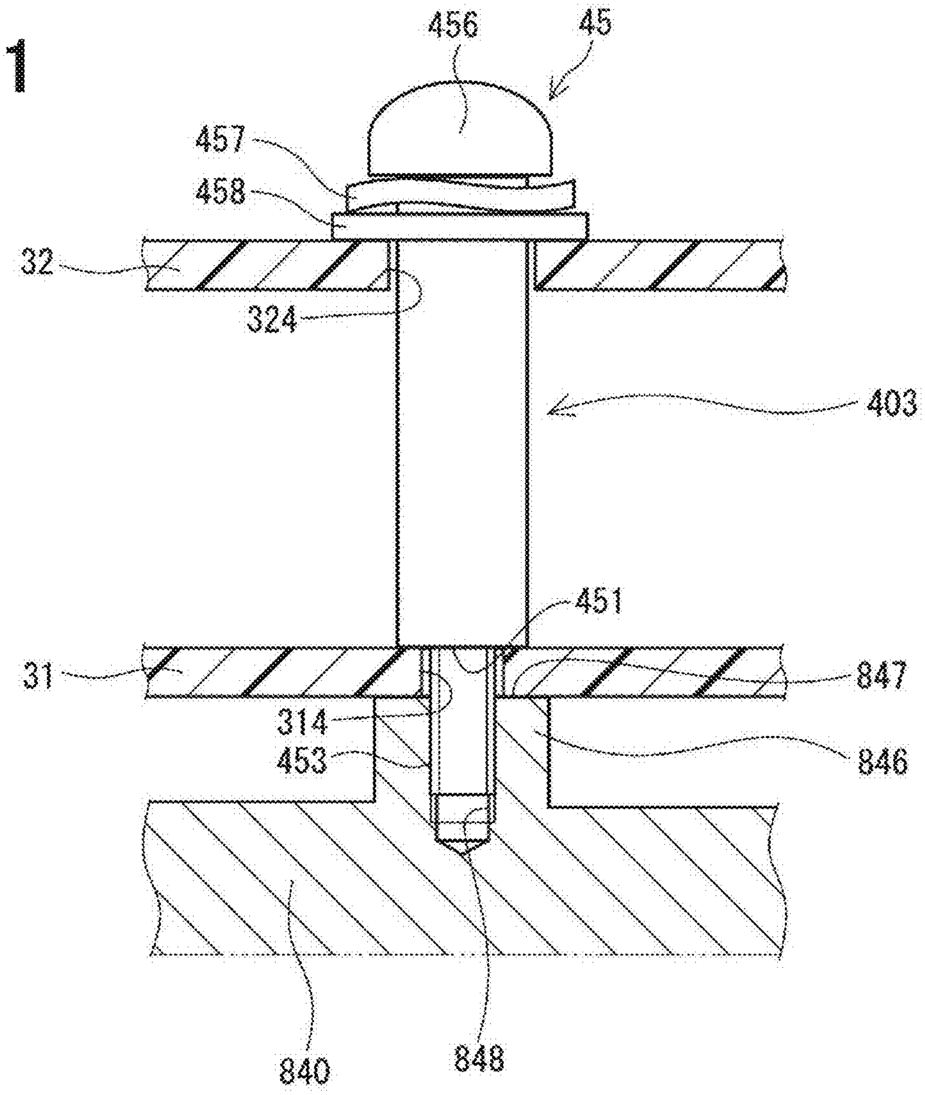
FIG. 11 is a schematic diagram of a composite fastening member including a stepped bolt according to a third embodiment.

Next, third and fourth embodiments relating to variations of composite fastening members will be described with reference to FIGS. 11 and 12. A composite fastening member 403 according to the third embodiment shown in FIG. 11 includes a stepped bolt 45. The stepped bolt 45 has a male threaded portion 453 protruding from a stepped lower end surface 451 that comes into contact with the periphery of the fastening hole 314 of the motor-side board 31. The stepped bolt 45 further has a head 456 that abuts around the fastening hole 324 of the connector-side board 32 via a wave washer 457 and a washer 458.

In the third embodiment, after the motor-side board 31 and the connector-side board 32 are electrically connected by the plug connectors 77, 78 and the inter-board terminals 63, the motor-side board 31 and the connector-side board 32 are collectively fastened to the motor frame 840 by the stepped bolts 45. When the head 456 is rotated, an axial force is transmitted to the connector-side board 32 via the wave washer 457 and the washer 458, and is also transmitted from the step lower end surface 451 to the motor-side board 31. Note that when the motor-side board 31 is mounted on the motor frame 840, a pin for temporary fixation may be inserted into the female threaded portion 848 of the motor frame 840 through the fastening hole 314, depending on operational necessity.

Figure 12:
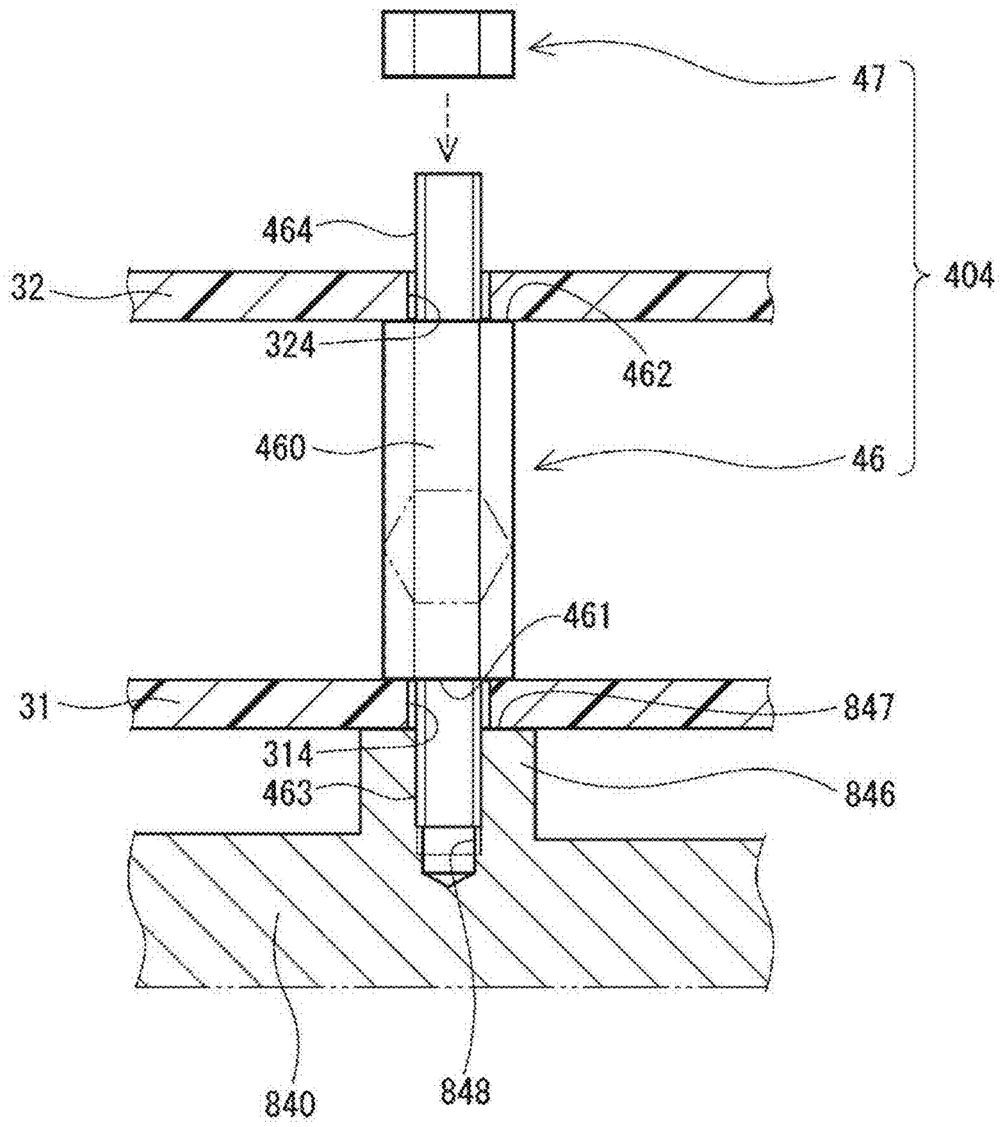
FIG. 12 is a schematic diagram of a composite fastening member including a double-threaded stud bolt and a nut according to a fourth embodiment.

A composite fastening member 404 according to the fourth embodiment shown in FIG. 12 includes a stud bolt 46 and a nut 47. The stud bolt 46 is a double male-threaded type and has a column portion 460 of a predetermined height. A two-dot chain hexagon shown in a middle of the column portion 460 indicates that a cross section of the column portion 460 is hexagonal and that the column portion 460 can be rotated using a tool. The stud bolt 46 that is the double male-threaded type has a lower male threaded portion 463 protruding from a lower end surface 461 of the column portion 460, and an upper male threaded portion 464 protruding from an upper end surface 462 of the column portion 460. The cross-sectional shape of the column portion 460 is not limited to a hexagon, and may have, for example, a two-face width portion formed on the outer periphery.

When the drive device 800 is assembled, first, the lower male threaded portion 463 of the double-threaded stud bolt 46 is screwed into the female threaded portion 848 of the motor frame 840 through the fastening hole 314 of the motor-side board 31, thereby fastening the motor-side board 31 to the motor frame 840. Next, the upper male threaded portion 464 of the threaded stud bolt 46 is inserted into the fastening hole 324 of the connector-side board 32 and is screwed into the nut 47, so that the connector-side board 32 is attached to the motor frame 840 via the stud bolt 46 of the double male-threaded type.

Similarly to the first embodiment, in the third and fourth embodiments, the motor-side board 31 and the connector-side board 32 are fastened to the motor frame 840 on the same axis. Accordingly, the space for fastening the motor-side board 31 and the connector-side board 32 can be reduced, and the mounting area for the electronic components on the motor-side board 31 and the connector-side board 32 can be ensured without increasing the diameter size of the drive device 800.

Reference Embodiment

Figure 13:
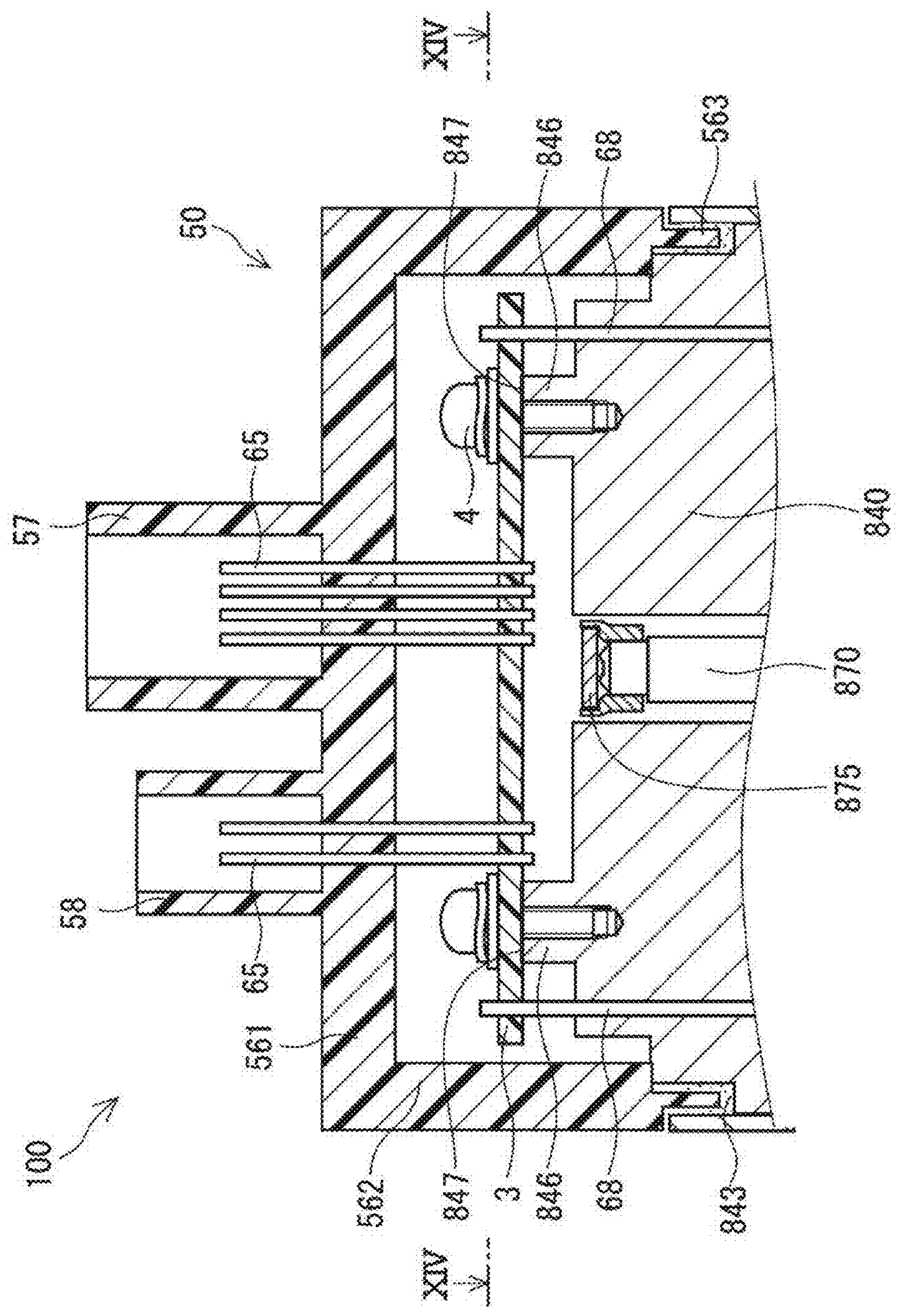
FIG. 13 is a schematic cross-sectional view of a control unit having a single board according to a reference embodiment.
Figure 14:
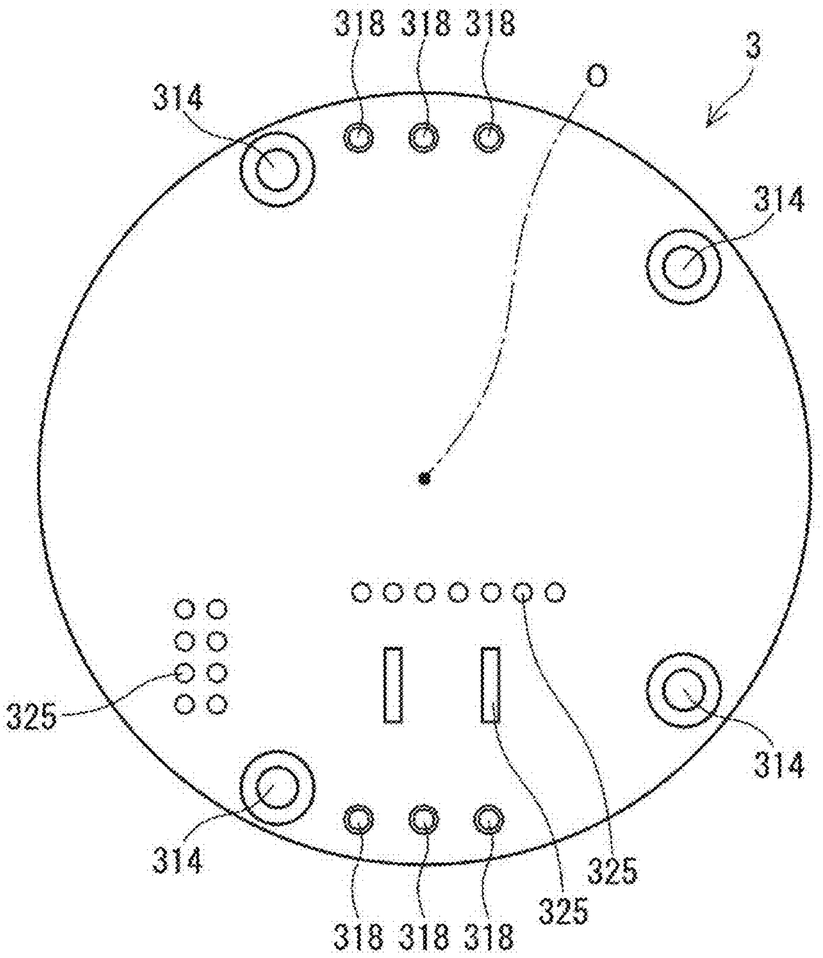
FIG. 14 is a plan view of the single board according to the reference example and corresponds to a cross-sectional view taken along line XIV-XIV in FIG. 13.

FIGS. 13 and 14 show a control unit 100 having a single-board configuration as a reference embodiment. For example, in a drive device with one system or "two-drive system", a circuit scale of the control unit 100 is small, so all electronic components can be mounted on a single board 3. Note that "two-drive system" refers to a configuration in which two systems of inverter circuits are connected in parallel to a common power source, and various signals are shared between the systems. The single board 3 is fastened to the motor frame 840 with general-purpose screws 4.

Therefore, when manufacturing two types of drive devices, one with a two-board configuration and one with a single-board configuration, it is preferable to make the fastening positions of the boards common. A plan view of the motor frame 840 to which the single board 3 is fastened is the same as FIG. 5. In the plan view of the single board 3 shown in FIG. 14, the fastening holes 314 and the motor terminal holes 318 are common to the fastening holes 314 and the motor terminal holes 318 in FIG. 6. Since one system includes one set of the power supply system connector 57 and the signal system connector 58, the number of connector terminal holes 325 is half the number of connector terminal holes 325 in FIG. 7.

In this way, by making the board fastening positions common for the two types of drive devices, one having a two-board configuration and the other having a single-board configuration, it is effective especially when the fastening equipment is shared in the same manufacturing line. It is also effective when the board component inspection equipment is shared.

OTHER EMBODIMENTS

Three or more boards may be arranged in multiple stages between the motor frame 840 and the top plate portion 561 of the cover 50. Generalizing N as an integer of 2 or greater, in the present disclosure, N boards may be arranged in multiple stages, from a first board closest to the motor frame 840 to an Nth board closest to the top plate portion 561. Even when three or more boards are provided, it is a requirement of the present disclosure that at least the first board and the second board are fastened on the same axis using a plurality of composite fastening members.

The third and higher boards may be independently fastened to the motor frame 840 without using the composite fastening member. In another example, the stud bolts according to the first embodiment may be stacked in two stages between the first board and the second board and between the second board and the third board, and the three boards are fastened on the same axis. In that case, it is interpreted that the "upper bolt" that fastens the second board is composed of the stud bolt.

Furthermore, when N boards are provided, the inter-board connection components electrically connect adjacent two boards. That is, inter-board connection components are provided between the first board and the second board, between the second board and the third board, and between the (N−1)th board and the Nth board, respectively. In that case, the same type of inter-board connection components may be used, or different types of inter-board connection components may be used in combination.

In the first embodiment, the composite fastening members 401 are used at all fastening points on the motor-side board 31 and the connector-side board 32. Without being limited to this configuration, the drive device 800 may also adopt a configuration in which, for example, the composite fastening members 401 are used at all fastening points (for example, two points) of the connector-side board 32, and the motor-side board 31 may be fastened to the motor frame 840 solely by general-purpose screws at other points (for example, two points). The drive device 800 may also adopt a configuration in which the composite fastening members 401 are used at only some of the fastening points of both the motor-side board 31 and the connector-side board 32, and the remaining points are fastened to the motor frame 840 independently.

The number, size, shape, and the like of the external connectors provided on the cover 50 are not limited to those exemplified in the above embodiment. The number of external connectors may be one or more. Furthermore, the external connector is not limited to a top type in which the external connector protrudes from the top plate portion 561 of the cover 50 in the axial direction of the motor 80, but may be a lateral type in which the external connector protrudes from the side surface of the outer cylindrical portion 562 in a direction perpendicular to the axial direction of the motor 80.

The drive device 800 of the present disclosure is not limited to the steering assist motor of the electric power steering apparatus, but may be used as a reaction force motor or steering motor of a steer-by-wire system, or any other type of motor drive device.

The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A drive device comprising:

a motor including a stator and a rotor;

a control unit disposed to one side of the motor in an axial direction of the motor and configured to drive and control the motor, the control unit being configured integrally with the motor;

a motor frame disposed at an end portion of the motor close to the control unit in the axial direction of the motor;

a cover including a top plate portion facing the motor frame and an outer cylinder portion extending from an outer edge of the top plate portion toward the motor frame, the cover having an external connector;

N boards on which electronic components constituting the control unit are mounted, N being an integer greater than or equal to two, the N boards being arranged in multiple stages between the motor frame and the top plate portion and including a first board closest to the motor frame and an Nth board closest to the top plate portion;

an inter-board connection component electrically connecting adjacent boards among the N boards; and composite fastening members fastening at least the first board and a second board, which is included in the N boards and arranged in a second stage, to the motor frame, wherein the composite fastening members fasten the first board to the motor frame on a same axis as fastening the second board to the motor frame, each of the composite fastening members includes:

a stud bolt having a column portion of a predetermined height, a male threaded portion protruding from a lower end surface of the column portion, and a female threaded portion formed at an upper end surface of the column portion, and fastening the first board to the motor frame; and an upper bolt having a male threaded portion screwed into the female threaded portion of the stud bolt, and fastening the second board to the motor frame via the stud bolt, and a diameter of the male threaded portion of the upper bolt is smaller than a diameter of the male threaded portion of the stud bolt.

2. The drive device according to claim 1, wherein the composite fastening members fasten the second board to the motor frame at all fastening points on the second board.

3. The drive device according to claim 1, wherein the inter-board connection component includes a plug connector whose height at a time of connection is adjustable.

4. The drive device according to claim 1, wherein the inter-board connection component includes inter-board terminals, and at least one end of each of the inter-board terminals is electrically connected to one of the N boards by a press-fit method.

* * * * *